United States Patent
Havaralu Rama Chandra Adiga et al.

(10) Patent No.: US 10,492,071 B1
(45) Date of Patent: Nov. 26, 2019

(54) DETERMINING CLIENT DEVICE AUTHENTICITY

(71) Applicant: Hewlett Packard Enterprise Development LP, Houston, TX (US)

(72) Inventors: Badrish Havaralu Rama Chandra Adiga, Bangalore (IN); Balaji Sankaran, Bangalore (IN); Vinay Kumar Vishwakarma, Bangalore (IN); Bhupesh Bhargava, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/176,901

(22) Filed: Oct. 31, 2018

(51) Int. Cl.
*H04W 12/06* (2009.01)
*H04W 12/08* (2009.01)
(Continued)

(52) U.S. Cl.
CPC ......... *H04W 12/06* (2013.01); *H04L 63/0853* (2013.01); *H04L 63/0876* (2013.01);
(Continued)

(58) Field of Classification Search
CPC ....... H04L 63/08; H04L 63/20; H04L 63/101; H04L 63/1433; H04L 63/102; H04L 63/0853; H04L 63/0876; H04L 63/308; H04L 63/0892; H04W 12/06; H04W 12/08; H04W 12/12; H04W 48/04
See application file for complete search history.

(56) References Cited

U.S. PATENT DOCUMENTS

| 8,661,522 B2 | 2/2014 | Huston, III et al. |
| 2008/0042912 A1* | 2/2008 | Lee ............ H04L 12/4641 |
| | | 343/713 |

(Continued)

FOREIGN PATENT DOCUMENTS

| CN | 102739464 | 4/2015 |
| EP | 2446654 | 5/2012 |

OTHER PUBLICATIONS

Aubry, M., Lock Down Accounts by IP After N Failed Attempts at Logging, (Web Page), Jan. 27, 2012, 6 Pgs.

(Continued)

*Primary Examiner* — George Eng
*Assistant Examiner* — Hung K Du
(74) *Attorney, Agent, or Firm* — Brooks, Cameron & Huebsch, PLLC

(57) ABSTRACT

A system and device for determining authenticity of a client device transmitting a request to access a network that includes an authenticator to adjust authentication parameters for authentication requests to access a network from a client device, and access switches positioned within the authentication, each of the plurality of switches having an associated port for receiving the authentication requests. The authenticator monitors authentication requests received from the client device, determines whether a number of the monitored authentication requests that are failed authentication requests, and determines mobility of the client device during the monitored authentication requests. Authenticity of the client device is determined based on one of the determined number of failed authentication requests and the determined mobility of the client device.

18 Claims, 5 Drawing Sheets

(51) Int. Cl.
*H04W 12/12* (2009.01)
*H04L 29/06* (2006.01)
*H04W 48/04* (2009.01)

(52) U.S. Cl.
CPC ........ *H04L 63/0892* (2013.01); *H04L 63/102* (2013.01); *H04L 63/308* (2013.01); *H04W 12/08* (2013.01); *H04W 12/12* (2013.01); *H04W 48/04* (2013.01)

(56) References Cited

U.S. PATENT DOCUMENTS

2010/0169952 A1* 7/2010 Maki ................. H04L 63/0846
  726/3
2018/0351944 A1* 12/2018 Cho .................. H04L 63/0838
2018/0375873 A1* 12/2018 Isola ................. H04L 63/101

OTHER PUBLICATIONS

Prevent Denial of Service Attacks Against Slow Hashing Functions, (Web Page), Retrieved Sep. 6, 2018, 5 Pgs.

* cited by examiner

DETERMINING CLIENT DEVICE AUTHENTICITY

BACKGROUND

Point-to-point protocol (PPP) can be used for dial-up Internet access and is used by some internet service providers (ISPs) for a digital subscriber line (DSL) and cable modem authentication, in the form of point-to-point protocol (PPP) over Ethernet. PPP has evolved beyond its original use as a dial-up access method and includes an authentication mechanism. For example, for dial-up Internet access, a user name and password are used for authentication and PPP authentication is utilized to identify the user at the other end of the PPP line before granting the user access. In order to provide additional security, an additional authentication protocol known as Extensible Authentication protocol (EAP) can be included within the PPP protocol. EAP provides a generalized framework for several different authentication methods and enables everything from passwords to challenge-response tokens and public-key infrastructure certificates to all work smoothly.

DETAILED DESCRIPTION

Figure 1:
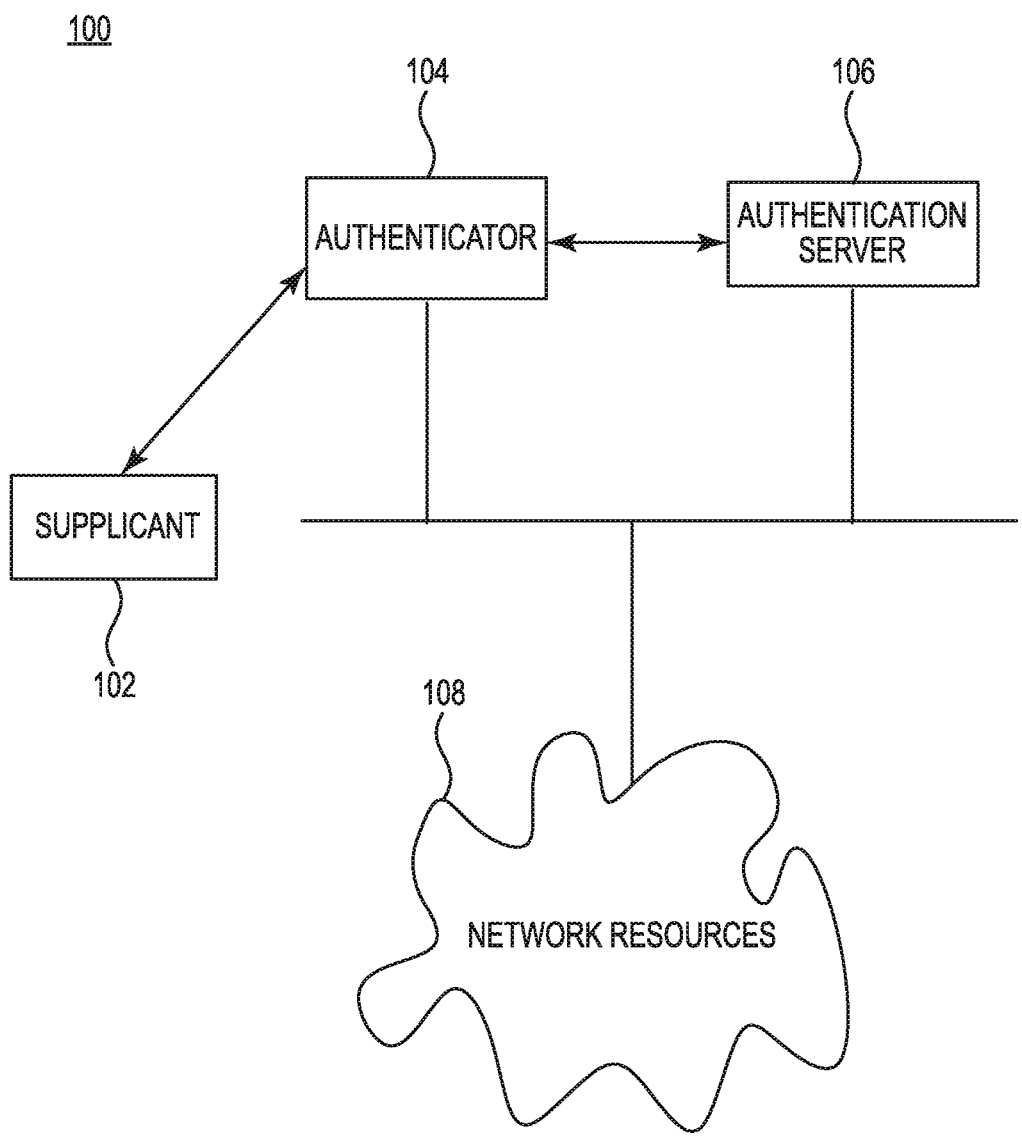
FIG. 1 is a schematic diagram of an example computer network in accordance with the present disclosure.

In computing, a denial of service (DOS) attack is a cyber-attack that can occur within the networking domain. In such DOS attacks, the perpetrator seeks to make a machine or network resource unavailable to it's intended users by temporarily or indefinitely disrupting services of a host connected to the Internet resulting in network resources being unavailable to other users or clients of the network. A network access client generating such attacks can be referred to as a "rogue client", The rogue client may make repeated attempts to authenticate to the network which could overload access devices, thereby blocking authentication services to other users.

In some previous approaches, the issue of DOS attacks from rogue clients is addressed by setting a rate limit on the number of authentication packets requesting authentication to the network that may be sent by a client device. However, while setting a rate limit may reduce the burden on the access switch of an authenticator device, the issue of DOS attacks from rogue clients would still persist. In some previous approaches, utilization of a heldPeriod is used to address the issue of DOS attacks, which includes a waiting period that begins after a failed authentication attempt by a client device that ends prior to permitting another attempt to authenticate. During this period, attempts by the client device to authenticate may be ignored by the authenticator. However, if the rogue client is completely mobile, i.e., is repeatedly moving across the ports of the access switch or authenticator, the issue of DOS attacks from rogue clients may still persist.

In some examples, DOS attacks by rogue clients can be reduced by monitoring a history of client device activity by an authenticator (access point or Ethernet switch). Based on the monitored history of access point behavior, a client device may be identified as being one of either a rogue static client, a rogue dynamic client, a legitimate or valid static client or a valid dynamic client, as described below in detail. Different measures may then be taken by the authenticator based on the determined client identity. For example, if it is determined that the client device has made a repeated number of attempts to authenticate that have been failed attempts, the client device may be identified as being a rogue client device. As a result, a waiting period another authentication request is permitted after a faded authentication attempt by a client device can be increased by the authenticator.

In another example, if it is determined that the client device has made a repeated number of attempts to authenticate that have been failed authentication attempts, and is therefore a rogue client, and that the rogue client device is mobile, i.e., is repeatedly moving across the ports of the access switches, the client device may be identified as being a rogue dynamic client device. As a result, a media access control (MAC) lockout may be configured by the authenticator that blocks the rogue dynamic client device from all access ports of the access switch of the authenticator.

In another example, if it is determined that the client device has made a repeated number of attempts to authenticate that have been successful authentication attempts, the client device may be identified as being a valid client device. If a predetermined number of the successful authentications of the valid client device were generated on the same port of the access switch of the authenticator, the valid client device may be further identified as being a valid static client device. As a result, a re-authentication period for re-authenticating a valid static client device may be gradually increased for the valid static client device, thereby reducing required network resources.

On the other hand, if a predetermined number of the successful authentications of a valid client device were not generated on the same ports but rather were generated on different ports, the valid client device may be further identified as being a valid dynamic client device. As a result, cached re-authentication may be utilized for the valid dynamic client device. During cached re-authentication, user credentials for the valid dynamic client device can be downloaded securely to the authenticator from an authentication server via secure channels, such as HTTPS, RADIUS over IPsec, etc. These cached credentials in the authenticator can then be used for periodic re-authentication of the valid dynamic client device when the authentication server becomes unavailable, such as when connectivity to the authentication server is lost, for example. As a result, a timeout of the re-authentication process, which could result in the valid authenticated valid dynamic client from being able to access the network, may be prevented from occurring.

The figures herein follow a numbering convention in which the first digit corresponds to the drawing figure number and the remaining digits identify an element or component in the drawing. For example, reference numeral 206 refers to element "206" in FIG. 2 and an analogous element may be identified by reference numeral 406 in FIG. 4. Analogous elements within a Figure may be referenced with a hyphen and extra numeral or letter. See, for example, elements 202-1, and 202-N in FIG. 2. Such analogous elements may be generally referenced without the hyphen and extra numeral or letter. For example, elements 202-1 and 202-N may be collectively referenced as 202. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1 is a schematic diagram of an example computer network 100 in accordance with the present disclosure. A computer network 100 may be a local area network (LAN). The LAN can be a computer network that links or interconnects devices such as computers within a limited area such as a residence, school, laboratory, university campus or office building. By contrast, a wide area network (WAN) covers a larger geographic distance in addition to also generally involving leased telecommunication circuits. A leased telecommunications circuit can involve a service contract between a provider and a customer whereby the provider agrees to deliver a bidirectional telecommunications circuit that connects two or more business locations. As illustrated in FIG. 1, the computer network 100, according to an example of the present disclosure, can include a supplicant 102, an authenticator 104 and an authentication server 106.

The supplicant 102 can be a user or client device, such as a laptop computer, that is requesting to be authenticated and connected to LAN resources 108. The term "supplicant" is also used interchangeably to refer to instructions running on the client that provides credentials to the authenticator 104 and therefore may also be referred to as a client.

The authenticator 104 is a network device, such as an Ethernet switch or wireless access point network, that provides a way for a computer system to verify that an identity of the client device is accurate as opposed to being a rogue client device not having permission to connect to the LAN resources 108. This verification of the client identity is commonly referred to as "authentication". The authenticator 104 can be a program, application, hardware, firmware, etc., typically performing somewhere on the computer network 100 to perform authentication. For example, the authenticator 104 can operate according to the IEEE 802.1X standard for which the authenticator 104 is an entity at one end of a point-to-point LAN segment that facilitates authentication of a client device connected to the other end of the point-to-point LAN segment. The authenticator 104 can be a network switch or a wireless access point that serves as a point of connection for computer devices joining the network 100.

The authentication server 106 can be a type of network server that validates and authenticates remote users or nodes connecting to an application or service. The authentication server 106 stores the user names and passwords that identify the client devices, along with user permissions to access an application or service. The authentication server 106 can be a host running instructions supporting authentication protocols, such as the remote authentication dial-in user service (RADIUS) protocol and the extensible authentication protocol (EAP). The RADIUS protocol is a networking protocol that provides centralized authentication, authorization and accounting (AAA) management for users that connect and use a network service. As a result of the broad support and the universal nature of the RADIUS protocol, RADIUS is often utilized by internet service providers (ISPs) and enterprises to manage access to the internet or internal networks, wireless networks, and integrated email services. These networks may incorporate modems, a digital subscriber line (DSL), wireless access points (WAPs), or more generally access points (SPs) for allowing a device to connect to a network, virtual private networks (VPNs), network ports, web servers, etc. RADIUS is a client/server protocol that runs in the application layer, which is an abstraction layer that specifies the shared communication protocols and interface methods used by hosts (i.e., a computer or other device that establishes a connection to a network) in a communication network. The EAP is an authentication framework used in wireless networks and point-to-point connections for providing transport and usage of keying material and parameters.

The authenticator 104 functions as a security guard for a protected network, such as network 108. The supplicant 102 (i.e., client device) may not be allowed to access through the authenticator 104 to a protected side of the network 100 until the identity of the supplicant 102 has been validated and authorized. In the 802.1X port-based authentication, the supplicant 102 provides credentials, such as a username and password or a digital certificate, for example, to the authenticator 104. The authenticator 104 can forward the credentials to the authentication server 106 for verification. If the authentication server 106 determines the credentials are valid, the supplicant 102 can be allowed to access resources located on the protected side of the network 100, i.e., the LAN resources 108. On the other hand, if the authentication server 106 determines the credentials are not valid, the authentication request of the supplicant 102 can be denied.

Figure 2:
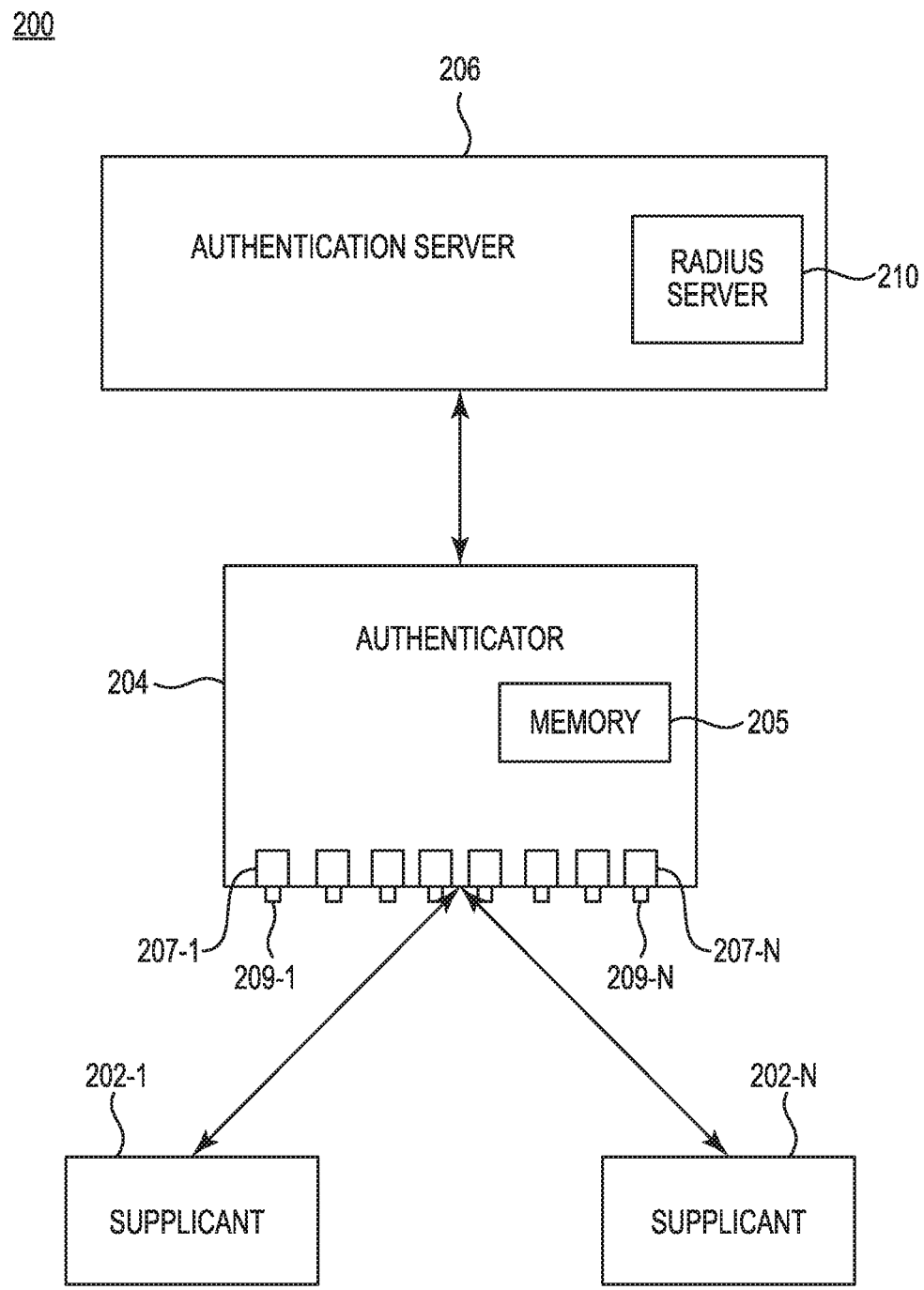
FIG. 2 is a schematic diagram of an example authentication system in accordance with the present disclosure.

FIG. 2 is a schematic diagram of an example authentication system 200 in accordance with the present disclosure. The authentication system 200 can include multiple client devices or supplicants 202-1, . . . , 202-N (hereinafter referred to collectively as supplicant 202), an authenticator 204 having a memory 205, and an authentication server 206 including a RADIUS server 210. The supplicant 202 can be a user or client device, such as a laptop computer, that is requesting to be authenticated and connected to LAN resources.

The authenticator 204 can be a network device, such as an Ethernet switch or wireless access point network, that includes a memory 205. The authenticator 204 can include a number of access switches 207-1 . . . , 207-N (hereinafter referred to collectively as access switches 207) each having corresponding ports 209-1 . . . , 209-N (hereinafter referred to collectively as ports 209) at which frames associated with requests for authentication are transmitted and received between the authenticator 204 and the one or more supplicants 202 for authenticating the supplicants 202 when the supplicants 202 are requesting network access. The authenticator 204 can be a program, application, etc., that operates somewhere on the authentication system 200 to perform authentication. For example, the authenticator 204 can operate according to the IEEE 802.1X standard and can be a network switch or a wireless access point that serves as a point of connection for the supplicant 202 requesting connection to authentication server 206. The authentication server 206 can be a host running instructions supporting authentication protocols, such as the protocol associated with the RADIUS protocol of RADIUS server 210.

The memory 205 can be any type of storage medium that can be accessed by the authenticator 204 to perform various examples of the present disclosure. For example, the memory 205 can be a non-transitory computer readable medium having computer readable instructions (e.g., computer program instructions) stored thereon that are executable by the authenticator 204 as described herein. The memory 205 can also be removable (e.g., portable) memory, or non-removable (e.g., internal) memory. For example, the memory 205 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, although the memory 205 is illustrated as being located in the authenticator 204, examples of the present disclosure are not so limited. For example, the memory 205 can also be located internal to another computing resource (e.g., enabling computer readable instructions to be downloaded over the Internet or another wired or wireless connection).

In order for the supplicant 202 to gain access to the network, an access request is transmitted from the supplicant 202 to the authenticator 204 via a link-layer protocol, such as the point-to-point protocol (PPP) in the case of a dial-up or digital subscriber line (DSL) provider, or in an HTTPS secure web form. The authenticator 204 can receive the request and transmit a RADIUS access request to the RADIUS server 210 of the authentication server 206 using a RADIUS protocol. Once the supplicant 202 is authenticated, the authenticator 204 can download the credentials associated with the valid authenticated supplicant 202 from the authentication server 206 via a secure channel so that the credentials may be subsequently utilized for periodic re-authentication of the supplicant 202 when the RADIUS server 210 subsequently becomes unavailable.

In this way, the system 200 can include the authentication server 206 to implement an authentication protocol for validating access to the network, along with the authenticator 204 to transmit credentials that indicate an identity of the client device 202 to the authentication server 204. As a result, authentication of the client device 202 can be performed at the authentication server 206 using the authentication protocol, as described below. The authenticator 204 downloads credentials of the authenticated client device 202 from the authentication server 206 via a secure channel, such as HTTPS, Radius over IPsec, etc., and determines, during a re-authentication period, whether the authentication server 206 is available. If the authentication server 206 is determined to be unavailable, the authenticator 204 performs re-authentication of the client device 202 using the downloaded credentials, as described below in detail.

Figure 3:
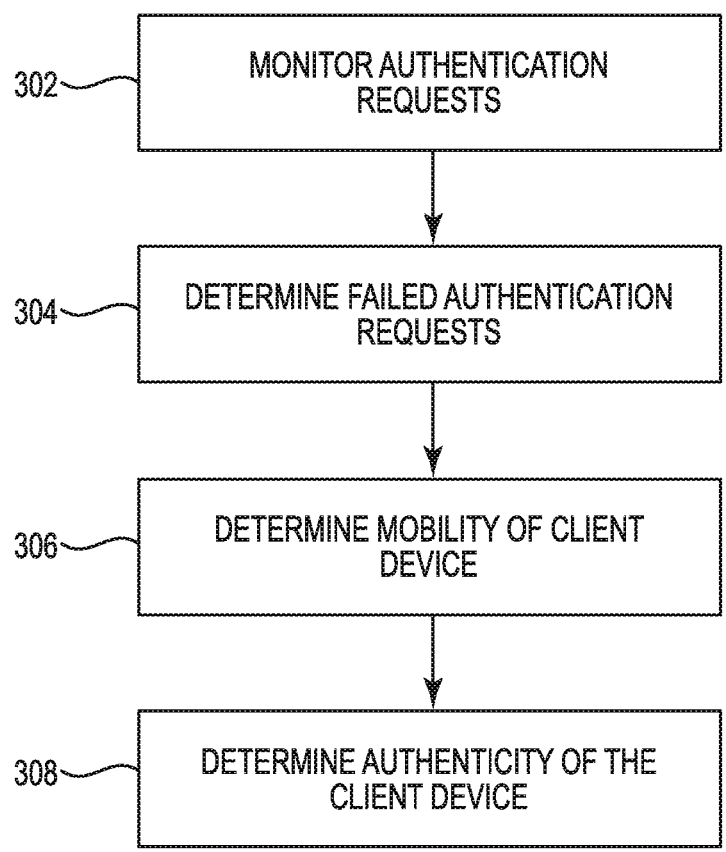
FIG. 3 is a flowchart of an example method of determining client device authenticity according to the present disclosure.

FIG. 3 is a flowchart of an example method 300 for determining client device authenticity according to an example of the present disclosure. Authentication of supplicants or client devices can be performed in response to a message flow between the client device, an authenticator, and an authentication server, as described below in detail in reference to FIG. 4. At 302, the authenticator monitors the authentication requests that are received from the client devices. The authenticator determines whether the quantity of failed authentication requests are greater than a failed authentication threshold and identifies the client device as being a rogue client device in response to the quantity of failed authentication requests are greater than the failed authentication threshold. Therefore, at 304, in order to determine whether a client device transmitting authentication requests is a rogue client device, a quantity of failed authentication requests transmitted by the client device are determined. For example, if the authenticator determines that there are a predetermined number of successive failed authentication requests, such as ten (10) consecutive failed authentication requests, the client device is determined to be a rogue client device. At 306, the authenticator determines the mobility of the client device based on the monitored authentication requests. For example, the rogue client device can be determined to be mobile if the authentication requests transmitted by the rogue client device are determined by the authenticator to be continuously moving across the ports of the access switches. At 308, the authenticator determines the authenticity of the client device based on the determined failed authentication requests for the client device and the determined mobility of the client device.

For example, based on the monitoring of client device activity by the authenticator, a client device may be identified as being one of either a rogue static client, a rogue dynamic client, a valid static client or a valid dynamic client. Different measures may then be taken by the authenticator based on the determined client identity. For example, if it is determined that the client device has made a repeated number of attempts to authenticate that have failed, the client device may be identified as being a rogue static client. As a result, a waiting period before another attempt to authenticate is permitted by the rogue static client device can be increased by the authenticator.

If it is determined that the client device has made a repeated number of attempts to authenticate that have been failed authentication attempts, and is therefore a rogue client, and that the rogue client device is mobile, i.e., is repeatedly moving across the ports of the access switches, the client device can be identified as being a rogue dynamic client. As a result, a media access control (MAC) lockout may be configured by the authenticator that blocks the rogue dynamic client device from all access ports of the access switch of the authenticator.

If it is determined that the client device has made a repeated number of attempts to authenticate that have been successful authentication attempts, the client device can be identified as being a valid client device. If a predetermined number of the successful authentications of a valid client device were generated on the same port of the access switch of the authenticator, the valid client device may be further identified as being a valid static client device. As a result, a re-authentication period for re-authenticating a valid static client device may be gradually increased for the valid static client, thereby reducing required network resources. On the other hand, if a predetermined number of the successful authentications of a valid client device were not generated on the same ports but rather were generated on different ports, the valid client device may be further identified as being a valid dynamic client device. As a result, cached re-authentication, described below, may be utilized for the client device.

Figure 4:
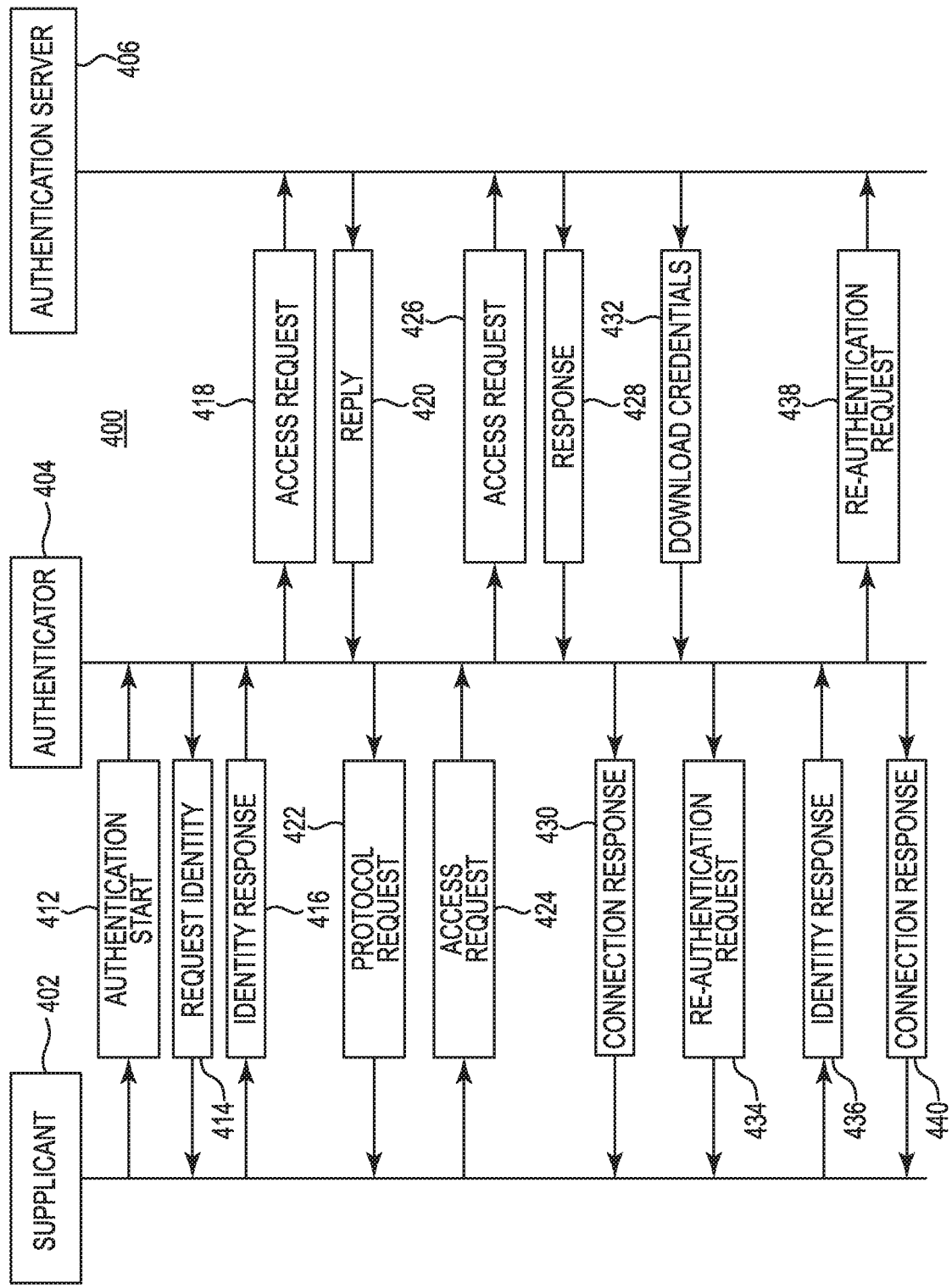
FIG. 4 illustrates an example of a message flow for performing authentication of a client device according to the present disclosure.

FIG. 4 illustrates an example of a message flow 400 for performing authentication of a client device according to an example of the present disclosure. In certain authentication protocols, such as the authentication protocol described in the IEEE 802.1X standard, authenticated clients can be periodically re-authenticated. This can result in de-authentication of stale authenticated clients, i.e., valid clients that have not been active for an extended period of time, thereby providing additional security to the network. However, during these periodic re-authentications, if the authentication server cannot be reached for a short period of time, such as during instances of loss of connectivity between the authenticator and the authentication server, the re-authentication process may timeout, forcing valid authenticated clients to become no longer authenticated and therefore de-activated from the network.

In order to reduce such instances where valid authenticated clients are unable to be authenticated during re-authentication due to loss of connectivity between the authenticator 404 and the authentication server 406 during authentication of a client device or supplicant 402, the message flow 400 of FIG. 4 may be utilized. In the example message flow 400, the supplicant 402 and the authenticator 404 can transmit messages using a given authentication protocol, such as the extensible authentication protocol (EAP), which is also known as EAP over LAN (EAPOL), for example. The supplicant 402 can initiate or restart authentication by transmitting an authentication start request 412 to the authenticator 404. The authenticator 404 receives the authentication start request 412 and transmits an identity request 414 to the supplicant 402. In another example, the authenticator 404 can periodically transmit the identity request 414 to a special Layer 2 address on a local network segment without receiving the authentication start request 412. In either example, upon receipt of the identity request 414, the supplicant 402 transmits an identity response 416 containing an identifier for the supplicant 402, such as a user ID for example, to the authenticator 404.

When the authenticator 404 receives the identity response 416, the authenticator 404 transmits the identity response 416 to the authentication server 406 using an access request protocol, such as a RADIUS access-request packet, for example, 418. Upon receipt of the access request 418, the authentication server 406 transmits a reply 420 to the authenticator 404 specifying the protocol method to be utilized by the supplicant 402. For example, the reply 420 can be an EAP request specifying the type of EAP based authentication the authentication server 406 would like the supplicant 402 to perform. The authenticator 404 then encapsulates a protocol request 422 in the specified protocol and transmits the request to the supplicant 402.

Upon receipt of the protocol request 422, the supplicant 402 can begin using the specified protocol method of the reply 420 or may transmit a negative acknowledgement (NAK) to the authentication server 406 via the authenticator 404 responding with protocol methods the supplicant 402 is willing to perform. Once the authentication server 406 and the supplicant 402 agree on the protocol method, the supplicant 402 transmits an access request 424 to the authenticator 404. The authenticator 404 translates the request 424 to conform to the given access protocol utilized between the authenticator 404 and the authentication server 406, such as RADIUS for example, and transmits the resulting translated request 426 to the authentication server 406. The authentication server 406 then determines whether access should be granted to the supplement 402 based on the received access request 426 and transmits a corresponding response 428 to the supplicant 402 via the authenticator 404, again using the access request protocol, such as a RADIUS access-request packet, for example, containing either a success message or a failure message.

Access requests 424 can be transmitted from the supplicant 402 to the authentication server 406 until authentication server 406 determines the response 428 from the authentication server 406 is a success message. If the response 428 is a success message, the authenticator 404 transmits a connection response 430 to the supplicant 402 containing a success message and sets the port to the "authorized" state and normal traffic is allowed between the supplicant 402 and the authentication server 406, enabling the supplicant 402 to access the desired network. On the other hand, if the response 428 is a failure message, the authenticator 404 sets the port to the "unauthorized" state and traffic is not allowed between the supplicant 402 and the authentication server 406. When the supplicant 402 logs off, the supplicant transmits a logoff message (not shown) to the authenticator 404, and the authenticator 404 then sets the port to the "unauthorized" state and traffic is not allowed between the supplicant 402 and the authentication server 406.

After transmitting the connection response 430 containing a success message, the authenticator 406 downloads and stores the credentials 432 for the supplicant 402 from the authentication server 406. After the supplicant 402 has been authenticated for a predetermined period of time, such as 60 minutes for example, the authentication server 404 transmits a re-authentication request 434 to the supplicant 402 requesting identity of the supplicant 406 for re-authentication. Upon receipt of the re-authentication request 434, the supplicant 402 transmits an identity response 436 containing an identifier for the supplicant 402, such as a user ID for example, to the authenticator 404.

When the authenticator 404 receives the identity response 436, the authenticator 404 attempts to transmit a re-authentication request 438 to the authentication server 406 using the access request protocol. If a response to the transmitted re-authentication request 438 is not received from the authentication server 406, the authenticator 404 determines that the authentication server 406 is not available. Therefore, the authentication server 404 makes the determination as to whether or not re-authentication should be granted to the supplement 402 based on the received identity response 436 and the saved downloaded credentials 434. The authenticator 404 transmits a corresponding connection response 440 to the supplicant 402 containing either a success message or a failure message. If the authenticator 404 determines re-authentication should be granted and therefore the connection response 440 is a success message, the authenticator 404 allows the port to continue to be set in the "authorized" state and normal traffic is continued to be allowed between the supplicant 402 and the authentication server 406, enabling the supplicant 402 to continue to access the desired network. On the other hand, if the authenticator 404 determines re-authentication should not be granted and therefore the connection response 440 is a failure message, the authenticator 404 sets the port to the "unauthorized" state and traffic is no longer allowed between the supplicant 402 and the authentication server 406.

If a response to the re-authentication request 438 transmitted by the authenticator 404 is received from the authentication server 406, the authenticator 404 determines that the authentication server 406 is available to perform re-authentication and therefore the authentication flow described at 424-430 is repeated between the supplicant 402, authenticator 404 and authentication server 406 in order to re-authenticate the supplicant 402.

Figure 5:
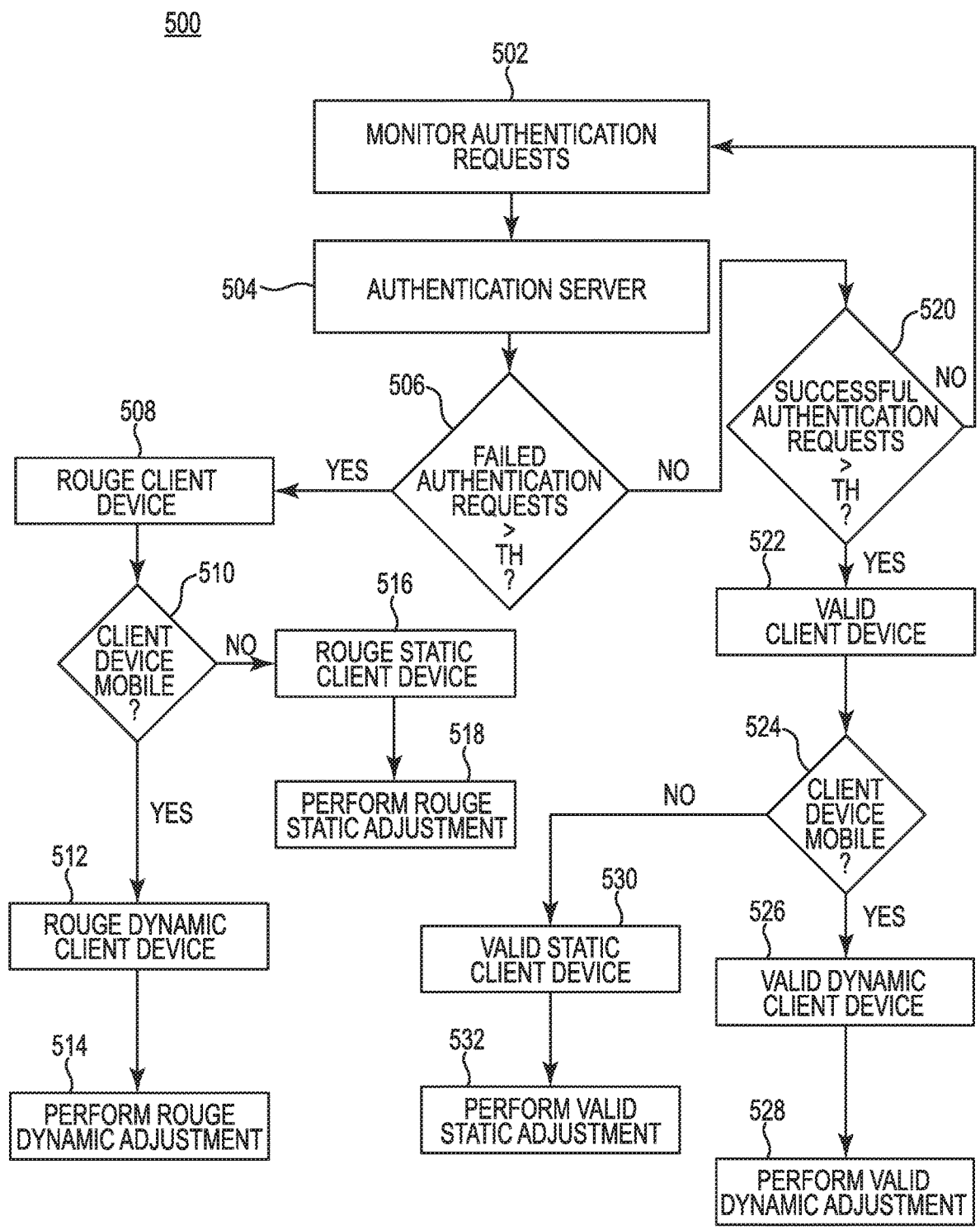
FIG. 5 is a flowchart of an example method of determining client device authenticity according to the present disclosure.

FIG. 5 is a flowchart of an example method 500 for determining client device authenticity according to the present disclosure. At 502, an authenticator monitors authentication requests received from a client device attempting to access a network. At 504, the authenticator determines the number of the authentication requests from the client device that are failed authentication requests, i.e., the number of access requests sent from the authenticator to the authentication server to which the authenticator receives a response from the authentication server that includes a failure message. At 506, the authenticator determines whether the number of failed authentication requests is greater than a failed authentication request threshold (TH).

If the number of failed authentication requests is greater than the failed authentication request threshold (YES from 506), the client device is determined, at 508, to be a rogue client device. For example, the authenticator can determine that if there are a predetermined number of successive failed authentication requests, such as ten (10) consecutive failed authentication requests, the client device is determined to be a rogue client device. At 510, a determination is made by the authenticator as to whether the rogue client device is mobile. For example, the rogue client device can be determined to be mobile if the authentication requests transmitted by the rogue client device are determined by the authenticator to be continuously moving across the ports of the access switches. If the rogue client device is determined, at 510, as being mobile (YES from 510), the rogue client device is identified, at 512, as being a rogue dynamic client device.

At 514, when the rogue device is identified as a rogue dynamic client device, the authenticator can perform a rogue dynamic client device adjustment. For example, the authenticator can configure a media access control (MAC) lockout for the rogue dynamic client device that blocks the rogue dynamic client device from all access ports of the access switches.

On the other hand, if the rogue client device is determined, at 506, not to be mobile if the rogue client device (NO from 510), based on the authenticator determining the rogue client device is not continuously moving across the ports of the access switches. If the rogue client device is determined not to be mobile, the rogue client device is identified, at 516, as being a rogue static client device, and, at 518, the authenticator can perform a rogue static adjustment. For example, the authenticator can increase a waiting period after a faded authentication attempt by the rogue static client device that must expire before the rogue static client device is allowed to attempt to authenticate again. For example, the authenticator can increase the waiting period by a percentage, such as 10 percent, for every certain number of failed authentication attempts by the rogue static client device, such as ten (10) consecutive failed authentication attempts, for example.

If, at 506, the number of failed authentication requests is not greater than the failed authentication request threshold and therefore the client device for the current monitored authentication requests is not identified as a rogue client device (NO from 506), the authenticator can determine, at 520, whether there are a predetermined number of successful authentication requests by the client device, such as ten (10) consecutive successful authentication requests for example. If it is determined that there are not the predetermined number of successful authentication requests (NO from 520), the process can be repeated for the next monitored authentication requests at 502. If it is determined that there are the predetermined number of successful authentication requests (YES from 522), the client device is determined at 522 to be a valid client device. At 524, a determination can be made by the authenticator as to whether the valid client device is mobile. For example, the valid client device can be determined to be mobile (YES from 524), and therefore, at 526, identified as being a valid dynamic client device if the authentication requests by the valid client device are determined by the authenticator to be continuously moving across the ports of the access switches. At 528, in response to the valid client device being identified as a valid dynamic client device at 526, the authenticator can perform a valid dynamic client device adjustment. For example, the authenticator can begin using the cached re-authentication described above for the valid dynamic client device.

At 530, when the valid client device is not determined to be mobile (NO at 524), the authenticator identifies the valid client device as being a valid static client device, and, at 532, the authenticator can perform a valid static client device adjustment. For example, the authenticator can increase the time period for initiating re-authentication of the valid static client device from the initial time period, such as increasing an initial re-authentication time period, i.e., 60 minutes for example, by a percentage, such as 10 percent for example, for every predetermined number of successive successful authentication requests, such as ten (10) successive successful authentication requests for example.

In some instances, a device may be attempting to transmit an authentication request to the authenticator that does not support the authentication protocol being utilized by the authenticator, such as a printer device for example. Therefore, alternative protocols must be provided to authenticate those devices. In such cases, the protocol utilized by the authenticator is disabled for a port of the authenticator, leaving the port unprotected and open for abuse. Therefore, an alternative option is to utilize a MAC authentication bypass (MAB) that is configured on the port. The port will then first attempt to check if the client device is utilizing the authenticator protocol, and if no response is received from the client device, will attempt to authenticate using the client device's MAC address as the username and password. The authenticator then makes provisions on the RADIUS server to authenticate the MAC addresses, either by adding them as regular users, or implementing additional logic to resolve them in a network inventory base.

In another example, the authenticator can identify a client device as a rogue client device if the authenticator detects toggling of authentication requests by the client device between a secure port and a non-secure port. In such instances, the authenticator may lock down the valid client device accessing the port to secure the port and prevent further MAC toggling from occurring at that port. In addition, by locking down the port, traffic destined to the valid client device is prevented from being forwarded to the rogue device.

In this way, an example device according to the present disclosure can include an authenticator to adjust authentication parameters for authentication requests to access a network from a client device, and a plurality of access switches positioned within the authentication, each of the plurality of switches having an associated port for receiving the authentication requests. The authenticator monitors authentication requests received from the client device, determines a number of authentication requests of the monitored authentication requests that are failed authentication requests, determines mobility of the client device during the failed authentication requests, and determines authenticity of the client device based on one of the determined number of failed authentication requests and the determined mobility of the remote client device.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A system for determining authenticity of a client device transmitting a request to access a network, comprising:
    an authentication server to implement an authentication protocol for authentication requests from the client device to access the network; and
    an authenticator to transmit identity credentials of the client device to the authentication server to perform authentication of the client device at the authentication server using the authentication protocol;
    wherein the authenticator comprises a plurality of access switches, each of the plurality of switches having an associated port for receiving the authentication requests, wherein the authenticator is to:
    monitor the authentication requests received from the client device;
    determine whether a quantity of the authentication requests are failed authentication requests;
    determine mobility of the client device in response to receiving the authentication requests; and
    determine authenticity of the client device based on one of the determined quantity of failed authentication requests and the determined mobility of the client device,
    wherein the authenticator increases the time period by a percentage for every predetermined quantity of successive authentication requests of the authentications requests that are successful authentication requests.

2. The system of claim 1, wherein the authenticator:
    determines whether the quantity of failed authentication requests are greater than a failed authentication threshold; and
    identifies the client device as being a rogue client device in response to the quantity of failed authentication requests are greater than the failed authentication threshold.

3. The system of claim 1, wherein the authenticator to determine mobility of the client device during the plurality of authentication requests comprises the authenticator to determine the client device is mobile in response to the authentication requests transmitted by the client device moving across multiple ports of access switches.

4. The system of claim 1, wherein the authenticator performs a media access control lockout in response to the client device is identified as a rogue client device and is determined to be mobile.

5. The system of claim 1, wherein the authenticator increases a waiting period subsequent to a failed authentication attempt by the client device in response to the client device being identified as a rogue client device and not being determined to be mobile.

6. The system of claim 1, wherein the authenticator:
    determines authentication requests of the plurality of authentication requests that are successful authentications; and
    identifies the client device as not being a rogue client device in response to the determined quantity of authentication requests that are successful authentications being greater than a successful authentication threshold.

7. The system of claim 6, wherein the authenticator initiates cached re-authentication in response to the client device being identified as not being a rogue client device and determining client device is mobile.

8. The system of claim 1, wherein the authenticator increases a period of time for initiating re-authentication of the client device in response to the client device being identified as not being a rogue device and determining the client device is not mobile.

9. A device for determining authenticity of a client device transmitting a request to access a network, comprising:
    an authenticator to adjust authentication parameters for authentication requests to access a network from a client device; and
    a plurality of access switches positioned within the authentication, each of the plurality of switches having an associated port for receiving the authentication requests, wherein the authenticator is to:
    monitor authentication requests received from the client device;
    determine whether a quantity of the monitored authentication requests are failed authentication requests;
    determine mobility of the client device during the monitored authentication requests; and
    determine authenticity of the client device based on one of the determined quantity of failed authentication requests and the determined mobility of the client device,
    wherein the authenticator increases the time period by a percentage for every predetermined quantity of successive authentication requests of the authentications requests that are successful authentication requests.

10. The device of claim 9, wherein the authenticator determines whether the quantity of failed authentication requests are greater than a failed authentication threshold and identifies the client device as being a rogue client device in response to the quantity of failed authentication requests are greater than the failed authentication threshold.

11. The device of claim 9, wherein determining mobility of the client device comprises determining the client device is mobile in response to the authentication requests transmitted by the client device are moving across multiple ports of access switches.

12. The device of claim 9, wherein the authenticator performs a media access control lockout in response to the client device is identified as a rogue client device and the client device is determined to be mobile.

13. The device of claim 9, wherein the authenticator increases a waiting period subsequent to a failed authentication attempt by the client device in response to the client device is identified as a rogue client device and the client device is not determined to be mobile.

14. The device of claim 9, wherein the authenticator determines a quantity of authentication requests of the monitored authentication requests that are successful authentication requests and identifies the client device as not being a rogue client device in response to the determined quantity of successful authentication requests is greater than a successful authentication threshold.

15. The device of claim 14, wherein the authenticator initiates cached re-authentication in response to the client device is identified as not being a rogue device and the client device is determined to be mobile.

16. The device of claim 9, wherein the authenticator increases a period of time for initiating re-authentication of the client device in response to the client device is identified as not being a rogue device and the client device is not determined to be mobile.

17. A non-transitory computer readable medium having instructions for performing a method, the method comprising:
- monitoring authentication requests received from a client for accessing a network;
- determining a quantity of the authentication requests that are failed authentication requests;
- determining mobility of the client device in response to receiving the failed authentication requests; and
- identifying the client device as a rogue client device based on one of the determined quantity of failed authentication requests and the determined mobility of the client device,
- adjusting authentication parameters for the authentication requests, wherein the authenticator increases the time period by a percentage for every predetermined quantity of successive authentication requests of the authentications requests that are successful authentication requests.

18. The non-transitory computer readable medium of claim 17, wherein the method further comprises:
- performing a media access control lockout in response to the client device is identified as a rogue client device and is determined to be mobile;
- increasing a waiting period subsequent to a failed authentication attempt by the client device in response to the client device being identified as a rogue client device and the client device being determined to be not mobile;
- initiating cached re-authentication in response to the client device being identified as not being a rogue device and the client device being determined to be mobile; and
- increasing a period of time for initiating re-authentication of the client device in response to the client device is identified as not being a rogue device and is not determined to be mobile.

\* \* \* \* \*